UNITED STATES PATENT OFFICE.

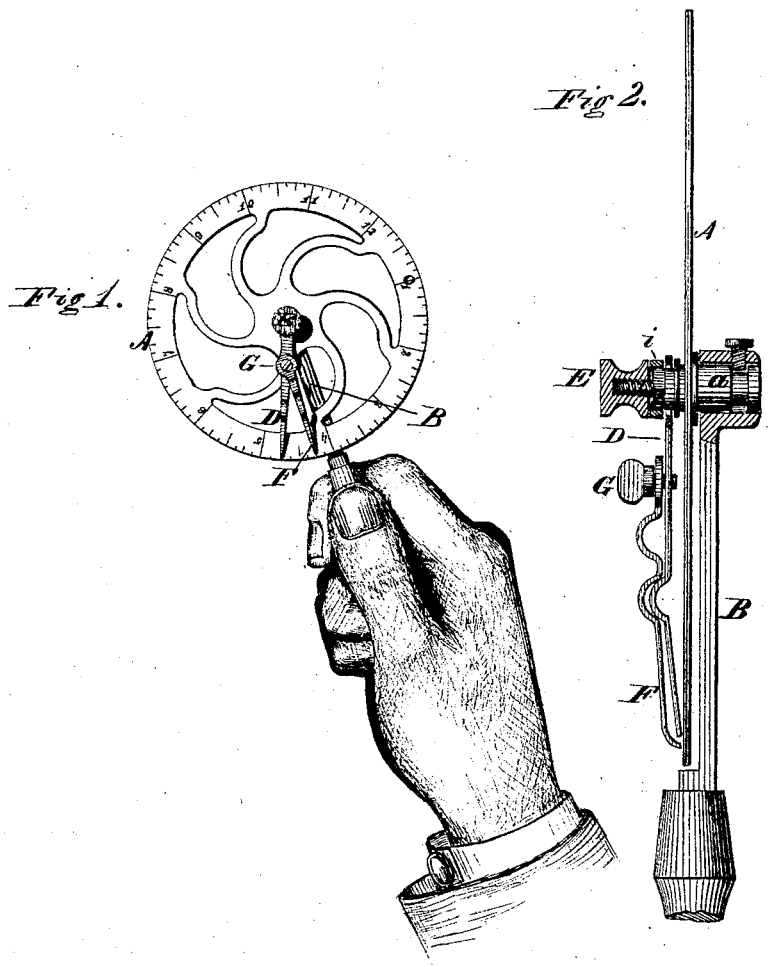

THOMAS R. WAY, OF SPRINGFIELD, OHIO.

IMPROVEMENT IN MEASURING-WHEELS.

Specification forming part of Letters Patent No. 135,185, dated January 21, 1873.

*To all whom it may concern:*

Be it known that I, THOMAS R. WAY, of Springfield, in the county of Clark, and State of Ohio, have invented certain Improvements in Measuring-Wheels, of which the following is a specification:

My invention relates to the measuring-wheels or travelers employed by blacksmiths to measure the circumference of wheels and the iron to form tires therefor; and the invention consists in providing the device with an extra hand or pointer pivoted to the hand which indicates the wheel-measure, for the purpose of deducting from said measure the amount to be allowed for expansion of the metal.

Figure 1 is a face view of my improved device; and Fig. 2 is a central cross-section of the same.

In constructing the device I first provide a wheel or disk, A, and through its center secure rigidly a shaft or axle, a, having a screw-neck on one end and a circumferential groove in the other, as shown in Fig. 2. I then mount the grooved end of the axle a loosely in the end of an arm or handle, B, and secure it by inserting a screw so as to bear in the groove, as shown in Fig. 2. On the front end of the axle I mount loosely a hand or pointer, D, and then screw upon the neck of the axle a thumb-nut, E, by which the hand may be secured rigidly to the wheel in any required position. In order to prevent the hand from being turned by the nut I insert between them a washer, i, which is held from turning by making the portion of the axle on which it fits of a square form. To the pointer D I secure, by means of a screw, G, a second pointer, F, which is carried with pointer D, but may have its end set and fastened at any required distance to one side thereof, as shown in Fig. 1. The hand D is for the purpose of indicating the wheel-measure, and the hand F for deducting therefrom the amount to be allowed for expansion of the iron, so as to indicate the exact point at which the iron is to be cut off. The device is applied and carried around the wheel to be measured in the same manner as those of the ordinary construction, and then the pointer D, adjusted and fastened in the usual manner, to indicate the wheel-measure. The pointer F is then fastened with its end a distance to one side of the other equal to the amount of expansion. The device is then applied to and carried over the iron, and the latter cut off at the point indicated by the small hand or pointer.

By this arrangement the tire-iron may be measured with great facility and accuracy, and the tires for different wheels of one size made of exactly the same length.

It is obvious that the device may be used by coopers for measuring hoops, and that in such case the extra pointer may be used to indicate the allowance for lap instead of that for expansion, as in the case of tires.

Having thus described my invention what I claim, is—

In combination with the measuring-wheel, provided with the adjustable pointer D, the pointer F, when arranged as and for the purpose set forth.

THOMAS R. WAY.

Witnesses:
  REUBEN MILLER,
  LEWIS E. STALEY.